June 5, 1962 R. A. BUB 3,037,637
SPIRAL ROLL FILTER UNIT
Filed April 26, 1960 2 Sheets-Sheet 1

INVENTOR.
ROBERT A. BUB
BY
Brown, Critchlow, Flick & Peckham
HIS ATTORNEYS

June 5, 1962 R. A. BUB 3,037,637
SPIRAL ROLL FILTER UNIT
Filed April 26, 1960 2 Sheets-Sheet 2

INVENTOR.
ROBERT A. BUB
BY
*His* ATTORNEYS 3,037,637
SPIRAL ROLL FILTER UNIT
Robert A. Bub, Penn Hills, Pa., assignor to Mine Safety
Appliances Company, a corporation of Pennsylvania
Filed Apr. 26, 1960, Ser. No. 24,752
5 Claims. (Cl. 210—487)

This invention relates to filters, and more particularly to those made by rolling the filter material into a coil, the axis of which extends lengthwise of the fluid stream being filtered.

It is among the objects of this invention to provide a coiled filter unit which is easy to make, uses only one strip of filtering material, which protects its filtering material from damage, and which has a minimum of seams. Patents such as Number 2,889,932 require at least twice as many seams and two filtering strips.

In accordance with this invention, a pair of separator strips of any suitable construction are disposed against the opposite sides of a strip of filtering material that extends lengthwise of them. The width of the filtering strip is more than twice as great as the width of its area between the separator strips. The filtering strip extends laterally from between the adjacent faces of the separator strips and around one edge of at least one separator strip and back at least part way across its opposite face. After the three strips have been assembled in this manner, they are rolled together into a coil, in which one edge of the filtering strip is sealed to its opposite edge in such a manner that a filter sheet is formed that is zig-zag in radial section. Preferably, the separator strips project beyond the folds of the filtering strip to protect those folds.

The invention is illustrated in the accompanying drawings, in which.

Figure 1:
FIG. 1 is an end view of a separator strip and a filtering strip, showing one way of performing the first step in the method.
Figure 2:
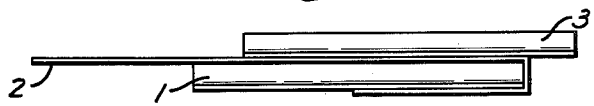
FIG. 2 is a similar view, showing the second separator strip added and the filtering strip partly folded.

Referring to FIG. 1 of the drawings, a separator strip 1 of suitable form, which conveniently may be a corrugated strip of metal or paperboard, is laid along the top of a much wider strip 2 of filtering material. The length of the strips will depend on the diameter of the filter coil to be made from them. The entire area of the separator strip does not overlie the filtering strip, but projects laterally from it. The uncovered portion of the filtering strip then is folded around the adjacent edge of the separator strip and back across its upper face, from the opposite edge of which it now projects as shown in FIG. 2. A second separator strip 3 is laid on top of the filtering strip and preferably is offset relative to the other separator strip so that the upper strip will project laterally beyond the edge of the lower strip that the filtering strip extends around. The upper separator strip preferably is of such width that the free edge of the lower strip will project laterally beyond it as shown. For ease of fabrication, the two separator strips have the same width, although that is not absolutely necessary.

Figure 3:
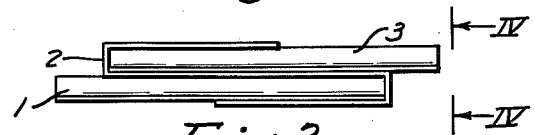
FIG. 3 shows the next step.
Figure 4:
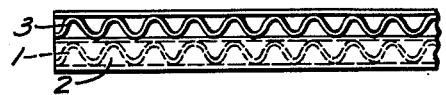
FIG. 4 is a fragmentary edge view taken on the line IV—IV of FIG. 3.

The next step in the process is to fold the laterally projecting upper portion of the filtering strip 2 around the adjacent edge of the upper separator strip and part way across its upper or outer surface, as shown in FIG. 3, so that the filtering strip appears S-shaped. The filtering strip is more than twice, but less than three times, as wide as the area of the separator strips where they overlap; that is, the distance between the inner edges of the two separator strips. As a result, the edges of the filtering strip overlap each other only a short distance. The overlap can be located centrally as shown or near one edge of one of the separators. The width of the filtering strip is determined in the beginning by adding together twice the depth that the filtering member is to have in the finished coil, twice the thickness of a separator, and the distance that the edges of the filtering strip are to overlap each other.

Figure 5:
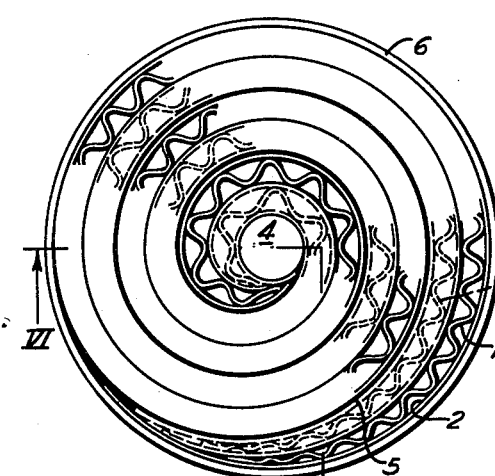
FIG. 5 is an end view of the roll.
Figure 6:
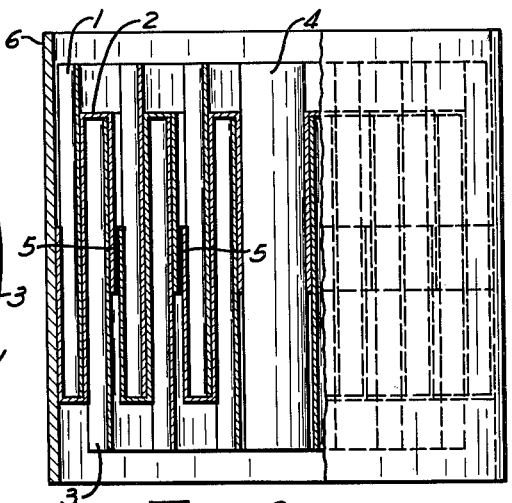
FIG. 6 is a combined side view and longitudinal section taken on the line VI—VI of FIG. 5.

The assembly of strips formed in the manner just described is then rolled up into a coil, as shown in FIG. 5, like a jelly roll. For best results, the strips are rolled around a central core member 4 so that there will not be a central axial passage through the roll. As the coil is being formed, one edge of the filtering strip will engage and overlap its opposite edge as shown in FIG. 6. In some cases, they may engage each other tightly enough to form a seal, but usually the overlapping edges are sealed together by an additional element, such as an adhesive 5 that can be applied either before or as the material is rolled up. The result is that the filtering material 2 forms a continuous zig-zag filter sheet extending from the outside of the roll to the core as shown in FIG. 6. To help hold the roll together and in cylindrical form, it is encircled by an impervious band or cylinder 6. However, the coil can take other shapes if desired, such as elliptical, triangular, or square.

It will be seen that in this filter, only one filtering strip is used and its seams are located only between alternate layers of the separator strips and not between every pair of layers, whereby the number of seams that have to be sealed are reduced materially. The offset separator strips projecting beyond the end folds of the filtering strip protect those folds from abrasion and other damage. In case the filtering material is provided with enough stiffness, the separators can be withdrawn and reused, leaving the full area of the filter sheet unobstructed. It also is possible to use multiples of the filtering strip and the separator strips in making a coil.

Figure 7:
FIGS. 7 and 8 are end views, similar to FIGS. 1 and 3, of a modification.
Figure 8:
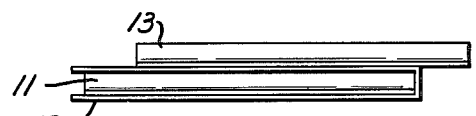
Figure 9:
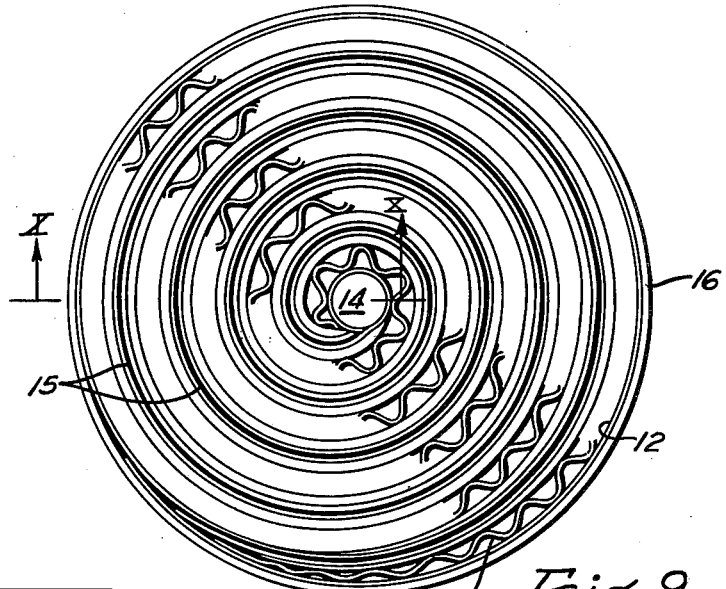
FIG. 9 is an end view of the modified roll.

In the modification of the invention shown in FIGS. 7 to 10, a separator strip 11, corrugated or the like, is laid along the top of a much wider filtering strip 12. Usually, the latter will project from both edges of the separator strip, although only a slight amount from the one edge, as shown in FIG. 7. The wide uncovered portion of the filtering strip then is folded around the adjacent edge of the separator strip and back across its upper face to project a short distance beyond the opposite edge of the separator strip. Preferably, both edges of the filtering strip will project the same distance from the adjoining edge of the strip between them. A second separator strip 13 is laid on top of the filtering strip a little distance from the latter's edge. It is desirable that both separator strips have about the same width, whereby they will be offset relative to each other as shown in FIG. 8. It will be seen that the folded filtering strip is U-shaped in cross section, and that it is more than twice as wide as the area between the two separator strips.

Figure 10:
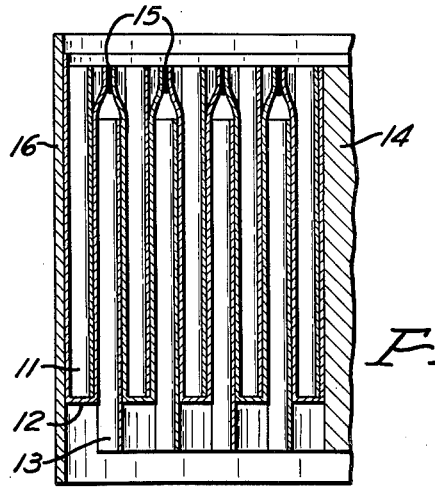
FIG. 10 is a fragmentary longitudinal section taken on the line X—X of FIG. 9.

The assembly now is rolled into a coil, preferably around a central core 14. Before or after the coil is formed, a band of adhesive 15 is applied to one projecting edge of the filtering strip, and after the coil is completed the marginal portions of the strip at opposite sides of separator 13 are pressed together to cause them to adhere as shown in FIG. 10. Like the first embodiment of the invention, the filtering material will now form a continuous zig-zag filter sheet extending from the core to the outside of the roll, which may be encircled by an impervious band or cylinder 16 to keep the roll coiled.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A filter coil comprising a pair of separator strips disposed in spaced face-to-face relation, a strip of filtering material spacing said separator strips apart and extending lengthwise thereof, the width of the filtering strip being more than twice as great as the width of the area of that strip between the separator strips, the filtering strip extending laterally from between the adjacent faces of the separator strips and around one edge of at least one separator strip and back at least part way across its opposite face, and all of said strips being formed into a coil with one edge of the filtering strip sealed to the opposite edge thereof to form a zigzag filter sheet in radial section.

2. A filter coil comprising a pair of separator strips disposed in spaced face-to-face relation, a strip of filtering material spacing said separator strips apart and extending lengthwise thereof, the filtering strip extending laterally from between the adjacent faces of the separator strips and around one edge of each separator strip and back part way across their opposite faces, the combined widths of the areas of the filtering strip at said opposite faces being slightly greater than the width of the area of that strip between said adjacent faces, and all of said strips being formed into a coil with one edge of the filtering strip overlapping and sealed to the opposite edge thereof.

3. A filter coil comprising a pair of separator strips disposed in spaced face-to-face relation, a strip of filtering material spacing said separator strips apart and extending lengthwise thereof, the filtering strip extending around one edge of one separator strip and across both of its faces and laterally beyond the opposite edge of the other separator strip, and all of said strips being formed into a coil with one edge of the filtering strip sealed to the opposite edge thereof to cover said opposite edge of said other separator strip.

4. The method of making a filter coil, comprising laying a separator strip on a much wider strip of filtering material with part of the separator strip projecting laterally from the filtering strip, folding the filtering strip around one edge of the separator strip and across that strip, laying a second separator strip on the folded strip, folding the filtering strip around one edge of the second separator strip and part way across that strip, and rolling all of said strips together into a coil with one edge of the filtering strip overlapping and tightly engaging the opposite edge thereof.

5. The method of making a filter coil, comprising laying a separator strip on a much wider strip of filtering material, folding the filtering strip around one edge of the separator strip and across that strip, laying a second separator strip on the folded strip in a position spaced laterally from the edges of the filtering strip, rolling all of said strips together into a coil, bringing together across an edge of the second separator strip the adjacent filtering strip edges, and sealing said adjacent edges together.

References Cited in the file of this patent

UNITED STATES PATENTS

| | | |
|---|---|---|
| 2,427,862 | Judkins | Sept. 23, 1947 |

FOREIGN PATENTS

| | | |
|---|---|---|
| 803,101 | France | June 29, 1936 |
| 572,890 | Great Britain | Mar. 10, 1943 |
| 149,039 | Australia | Nov. 17, 1952 |